April 13, 1965   R. P. ROSS   3,178,492
COMPOSITE TILE
Filed Dec. 13, 1961

INVENTOR.
ROBERT P. ROSS
BY Clarence R. Patty, Jr.
ATTORNEY

United States Patent Office 3,178,492
Patented Apr. 13, 1965

3,178,492
COMPOSITE TILE
Robert P. Ross, Louisville, Ky., assignor to Corhart Refractories Company, Louisville, Ky., a corporation of Delaware
Filed Dec. 13, 1961, Ser. No. 159,180
5 Claims. (Cl. 264—60)

This invention relates to composite-tile wherein metal attachment means for interconnecting the tile to a metal structure are integrally bonded to a body of fused cast refractory by the solidification of molten refractory thereon and to an improved pavement overlying a metal base in material processing equipment and adapted to be a protective lining in contact with the material being processed, which pavement comprises these composite tiles wherein the metal attachment means is interconnected to a metal base by means of a fused metal bond.

There are many instances in material processing equipment where an abrasion resistant refractory pavement or lining is desired because of the nature of the material being processed, e.g., in chutes for cement kiln clinkers or for chunks of sintered taconite ore leaving the sintering grates. It is well known that a number of fused cast refractories are very resistant to mechanical abrasion even at high temperatures. The most notable of these fused cast refractories are those composed essentially of corundum or mixtures of corundum and zirconia. As is will known, fused cast refractories are made by melting appropriate crystalline oxide materials and then casting the molten oxides into molds having a cavity of the desired shape of the solidified refractory.

For most materials processing applications, only a thin bed or pavement of refractory would be economical. Thin fusion cast refractory blocks or tiles have to be made relatively small in the other two dimensions to prevent cracking during manufacture because of inherent solidification and cooling problems. This necessitates the attachment of many small tile pieces and the methods of attachment have most often turned out prohibitively expensive. The material, being smooth and non-porous, does not bond well with mortars even if the latter are compatible to the operation and can be properly cured. Special shapes to provide interlocking designs are readily cast at a moderate increase in casting cost, but these do not make a tight pavement without excessive grinding and core cleaning. Moreover, there is always the danger of a single block failing and loosening an entire area. Use of epoxy resins to bond the tiles to a steel base which could be heated to cure the resin have been tried in applications not involving high temperatures. However, in practice there is often no opportunity to apply heat on the underside of the steel base in existing equipment and in any case the curing is relatively slow.

It is an object of this invention to provide a fused cast refractory tile that can be readily and securely attached to a base of steel or other suitable metal in material processing equipment.

It is a further object of this invention to provide a readily and securely laid fused cast refractory tile pavement in material processing equipment.

It is another object of this invention to provide composite tiles, for use as a pavement in material processing equipment as aforesaid, of fused cast refractory solidified onto and partially around at least one metal attachment means or member, whereby a portion of the latter forms a part of the external surface of each tile that can be readily and securely attached to the metal base of the processing equipment.

Other objects and advantages will be apparent from the following disclosure.

The invention will be better understood by reference to the illustrated example shown in the accompanying drawing wherein.

The present invention is predicated on the discovery that a fused cast refractory tile can be provided with an integrally bonded metal attachment tab having an anchoring portion extending inwardly into the refractory tile body by means of casting the molten refractory onto the metal tab without melting or destroying the integrity of the metal tab. Fused cast refractories are commonly cast at temperatures of 1800° C. and above. These temperatures are far above the melting point of most common metals, e.g., steel. In fact, it was because of this melting point relationship that these metals have in the past been used as disposable cores for fused cast refractories since the cores were found to melt almost at once after an initially thin frozen refractory skin had formed around the core. However, in the present invention, the integrity of the metal tabs is not destroyed by melting apparently because the tiles cast are so small and the ratio of mold surface to block volume is so large that even the portion of the metal tabs extending into the refractory casting a short distance does not actually reach its melting point.

Figure 1:
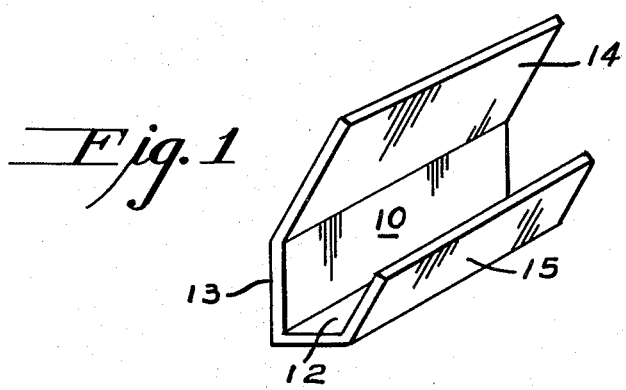
FIGURE 1 is a perspective view of a metal attachment means.

Referring now to the accompanying drawings, FIGURE 1 shows a preferred embodiment of the metal attachment means or tab 10. Successful results have been attained with tab 10 fabricated from mild steel strip as thin as 3/16" when utilized with the fused cast refractory disclosed in U.S. Patent 2,438,552 to T. E. Field.

Figure 2:
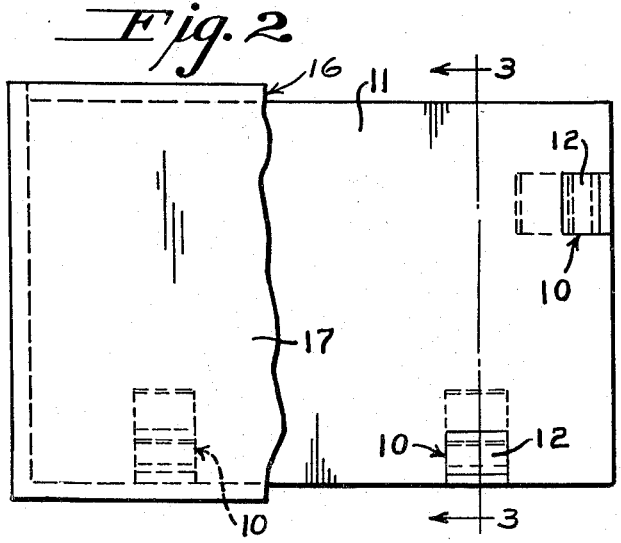
FIGURE 2 is a view of the rear face of a composite tile.
Figure 3:
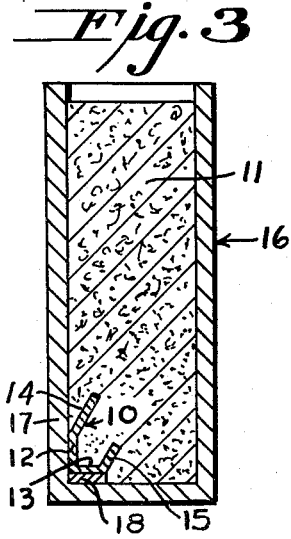
FIGURE 3 is a cross-sectional view of the composite tile in the mold, the tile cross-section being taken along line 3—3 of FIGURE 2.

A preferred embodiment of a composite tile of the invention is shown in FIGURES 2 and 3 wherein metal tabs 10 are integrally bonded to a fused cast refractory body 11. Each tab 10 has segments 12 and 13 with their outer surfaces forming an external portion of the composite tile and their inner surfaces in contact with the refractory body. Also, each tab 10 has segments 14 and 15 extending inwardly into the refractory body and these segments are integrally bonded to the refractory body as a result of the solidification of molten refractory on their surfaces.

The composite tiles of this invention are made in substantially the same customary manner of making fused cast refractories) e.g., as shown in U.S. Patent 1,615,750 to G. S. Fulcher). The preformed mold 16 is preferably of sand in which there has been included a common organic core binder, e.g., linseed oil. This sand mold is then surrounded with an insulation material to control the cooling rate and prevent cracking of the cast refractory as a result of severe thermal gradient stresses. In preparing the mold 16 for casting of the composite tiles, tabs 10 are appropriately positioned in the mold cavity by pasting the outer surface of segments 12 to the mold wall 17. For this purpose, any suitable commercial adhesive, such as Archer-Daniels-Midland liquid paste No. 267, can be used as the paste. It has been found desirable to indent the outer surfaces of segments 13 from the side surfaces of the refractory body. This can be accomplished by inserting an appropriate sand core 18 with each tab 10 in the mold. If desired, appropriate protruding sand core structures can be integrally molded into the preformed mold wall prior to baking of the mold or a blob of mold paste can be used to prevent flow of the cast refractory liquid into the space where the indentation is desired.

After the molten refractory has been cast into the preformed mold 16, the remaining quantity of organic core binder burns and forms a reducing atmosphere to prevent the metal tab segments 12 and 13 exposed at the surface of the cast tile from oxidizing during cooling of the casting. A mold 1¼" thick has been found to burn slowly enough to keep a ³⁄₁₆" x 1" steel tab from oxidizing in casting a 12" x 6" x 2" tile. Slightly thinner steel tabs have shown oxidation at the surface, which probably occurs before the burning mold can build up a protective reducing atmosphere. The purpose of preventing oxidation is to maintain the integrity of the steel tab and to have a clean metal surface that can be welded, soldered or brazed to a metal base which is to be lined with the tile.

In order to further assure successfully cast composite tile, cooling can be more rapid than for the customarily larger size castings, e.g., for glass tank blocks, etc. Thus, it is not necessary to use a highly insulating layer like diatomaceous earth surrounding the mold and dry sand has been found suitable.

While sand molds have been found desirable for enhancing the abrasion resistance of fused cast refractory, molds can be made of other materials, such as alumina, coke, and graphite, when desired for other purposes.

Figure 4:
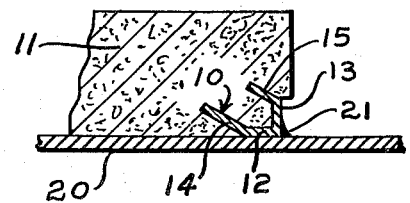
FIGURE 4 is a fragmentary view of a chute partially lined with composite tile according to the invention.

In FIGURE 4, one representative application in material processing equipment for the unique pavement according to this invention is illustrated. A steel shell 20 of a chute is lined with the composite tile comprising refractory body 11 and steel tab 10. The tiles are laid in rows so that the exposed surface of segment 12 of tabs 10 is placed against the steel shell 20. As each tile is laid in place, weld 21 is made between segment 13 and the steel shell 20. The indentation of segment 13 in the refractory body 11 allows space for weld or solder metal so that the latter does not prevent the tiles from fitting together. Thus, the pavement construction is made secure in a quick and economical fashion.

Although tack welding is preferred for interconnecting steel tabs with a steel base, other means of forming a fused metal bond can be used, especially when other metals are used for the tabs 10 or the shell 20. For example, soldering or brazing can be utilized when tabs 10 are made of copper or copper-base alloys. When the latter metals are used for tabs 10, the insulating layer surrounding the mold for the composite tile should be ground coke to provide a greater reducing atmosphere in the mold because copper tends to oxidize more readily than steel.

Thus, the present invention provides a novel composite tile and a unique pavement for lining material processing equipment, particularly where abrasion resistant linings are necessary even at high temperatures. Besides chutes for cement kiln clinkers or for chunks of sintered taconite ore leaving the sintering grates, other applications for the present invention requiring abrasion resistance at high temperatures are in feed tables of sinter plants, dust collector cones, discs for taconite pelletizing, conveyor belt scrapers and fluidizers of petroleum crackers. The present invention can also be used where resistance to chemical reaction or corrosion is required in addition to abrasion resistance in high temperatures, e.g., in blast furnace stock line lining and blast furnace coke chutes.

Moreover, the present invention is well suited in abrasion resistance applications at lower temperatures in chute linings for such things as cullet handling, coke screening, crushers, and ore handling, and in linings for ball mills, agitator tanks, froth concentrators, ore launders, thickeners, gas washers for blast furnaces, sideboards on coke conveyor belts, and pipe linings.

The present invention is not restricted to abrasive application, but can be applied in areas where the other properties of the particular fused cast refractory utilized make it suitable, e.g., linings for the back wall support and for the piers in an open hearth furnace. Fused cast refractory compositions particularly suitable in tiles for the latter applications are those composed essentially of chromic oxide and magnesia, as illustrated in U.S. Patents 2,599,566 and 2,690,974 to R. J. Magri, Jr.

It should be understood that the illustrated embodiments of the invention may be varied within the spirit of the invention and, accordingly, it is intended that the scope of the present invention be limited only by the appended claims.

What is claimed is:

1. The method of making a metal-fused cast refractory composite thin tile comprising constructing a mold of a refractory material including a material that forms a reducing atmosphere in said mold upon casting molten refractory therein, said mold having a cavity-defining surface corresponding to the external configuration of said tile, providing at least one metal attachment means for said tile, the metal of said attachment means being a metal having a melting point lower than the melting point of said molten refractory, adhering said attachment means to said cavity-defining surface with a portion extending inwardly into the mold cavity from said surface, casting said molten refractory into said mold cavity and onto said attachment means, and solidifying the molten refractory in said mold and onto said attachment means.

2. The method of making a metal-fused cast refractory composite thin tile comprising constructing a mold of a refractory material, said mold having a cavity-defining surface corresponding to the external configuration of said tile, providing at least one metal attachment means for said tile, the metal of said attachment means being a metal having a melting point lower than the melting point of said molten refractory, adhering said attachment means to said cavity-defining surface with a portion extending inwardly into the mold cavity from said surface, casting said molten refractory into said mold cavity and onto said attachment means, and solidifying the molten refractory in said mold and onto said attachment means.

3. The method of claim 2 wherein said metal attachment means is fabricated of steel.

4. The method of claim 3 wherein said molten refractory is composed essentially of oxidic material selected from the group consisting of corundum and mixtures of corundum and zirconia.

5. The method of claim 1 wherein said metal attachment means is fabricated of a material selected from the group consisting of copper and copper-base alloys.

References Cited by the Examiner

UNITED STATES PATENTS

| 2,230,141 | 1/41 | Heuer | 50—160 |
| 2,497,887 | 2/50 | Hilpert | 50—437 |
| 2,517,876 | 8/50 | Heuer | 110—99 |

JACOB L. NACKENOFF, Examiner.

BENJAMIN BENDETT, Primary Examiner.